United States Patent
Goss et al.

(10) Patent No.: US 10,082,925 B2
(45) Date of Patent: Sep. 25, 2018

(54) OPERATOR CONTROL DEVICE FOR A DOMESTIC APPLIANCE, HAVING AN ELECTRONIC DISPLAY PANEL, AND A DOMESTIC APPLIANCE HAVING SUCH AN OPERATOR CONTROL DEVICE

(75) Inventors: Ulrich Goss, München (DE); Robert Sachon, München (DE)

(73) Assignee: BSH Haugeräte GmbH, Munich (DE)

( * ) Notice: Subject to any disclaimer, the term of this patent is extended or adjusted under 35 U.S.C. 154(b) by 1165 days.

(21) Appl. No.: 13/991,933

(22) PCT Filed: Dec. 12, 2011

(86) PCT No.: PCT/EP2011/072416
§ 371 (c)(1),
(2), (4) Date: Jun. 6, 2013

(87) PCT Pub. No.: WO2012/080155
PCT Pub. Date: Jun. 21, 2012

(65) Prior Publication Data
US 2013/0268098 A1 Oct. 10, 2013

(30) Foreign Application Priority Data

Dec. 16, 2010 (DE) .................. 10 2010 063 188

(51) Int. Cl.
*G09G 5/00* (2006.01)
*G06F 3/0481* (2013.01)
(Continued)

(52) U.S. Cl.
CPC ........ *G06F 3/0481* (2013.01); *A47L 15/4293* (2013.01); *D06F 39/005* (2013.01); *F24C 7/082* (2013.01); *G05G 1/08* (2013.01)

(58) Field of Classification Search
CPC ........ A47J 27/002; A47J 27/004; A47J 44/00; A47J 45/00; F24C 7/00; F24C 7/06;
(Continued)

(56) References Cited

U.S. PATENT DOCUMENTS 7,889,187 B2 * 2/2011 Freier ................ G05D 23/1393
251/129.01
8,191,465 B2 6/2012 Sager et al.
(Continued)

FOREIGN PATENT DOCUMENTS

DE 102005032509 A1 4/2006
DE 102005032508 A1 7/2006
(Continued)

OTHER PUBLICATIONS

International Search Report PCT/EP2011/072416 dated Feb. 27, 2012.
Report of Examination EP 11 802 025.4 dated Feb. 18, 2016.

*Primary Examiner* — Nelson Rosario
*Assistant Examiner* — Andrew Lee
(74) *Attorney, Agent, or Firm* — Michael E. Tschupp; Andre Pallapies; Brandon G. Braun

(57) ABSTRACT

An operator control device for a domestic appliance includes an electronic display panel having a cover, and an operator control element which is movable relative to the display panel to set operating conditions of the domestic appliance. The operator control element is embedded, at least in part, in the cover of the electronic display panel, and includes an annular front part having an upper face which projects, at least in part, above a level of an outer face of the cover.

71 Claims, 2 Drawing Sheets

(51) Int. Cl.
*A47L 15/42* (2006.01)
*D06F 39/00* (2006.01)
*F24C 7/08* (2006.01)
*G05G 1/08* (2006.01)

(58) Field of Classification Search
CPC .... F24C 7/08; H05B 3/68; H05B 1/00; H05B 6/00; A47L 15/4293; D06F 39/005; G06F 3/0481
USPC .............................................. 345/156; 700/83
See application file for complete search history.

(56) References Cited

U.S. PATENT DOCUMENTS

| | | | | |
|---|---|---|---|---|
| 8,440,945 | B2* | 5/2013 | Blumenthal | F24C 7/083 200/18 |
| 2007/0181410 | A1* | 8/2007 | Baier | F24C 7/082 200/17 R |
| 2010/0164896 | A1* | 7/2010 | Nakayama | G06F 3/044 345/173 |
| 2010/0177044 | A1* | 7/2010 | Plestid | G06F 1/169 345/167 |
| 2010/0253653 | A1* | 10/2010 | Stambaugh | H03K 17/9622 345/184 |
| 2010/0309116 | A1* | 12/2010 | Oh | G06F 3/0338 345/156 |
| 2011/0254710 | A1 | 10/2011 | Nakae et al. | |

FOREIGN PATENT DOCUMENTS

| | | |
|---|---|---|
| DE | 102006026187 A1 | 12/2007 |
| EP | 1258878 A2 | 11/2002 |
| EP | 0844325 B1 | 4/2003 |
| EP | 1220570 B1 | 10/2005 |
| JP | 2001053854 A | 2/2001 |
| WO | 2010112291 A2 | 10/2010 |

* cited by examiner

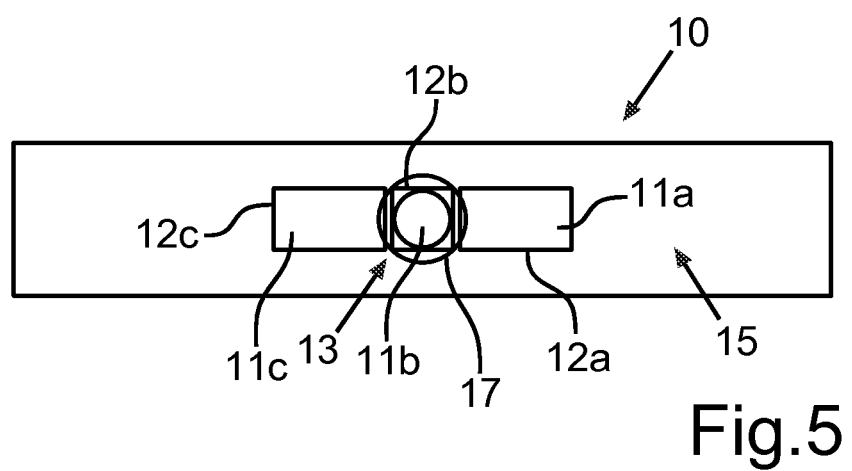

OPERATOR CONTROL DEVICE FOR A DOMESTIC APPLIANCE, HAVING AN ELECTRONIC DISPLAY PANEL, AND A DOMESTIC APPLIANCE HAVING SUCH AN OPERATOR CONTROL DEVICE

BACKGROUND OF THE INVENTION

The invention relates to an operator control device for a domestic appliance, having an electronic display panel, and an operator control element which can be moved relative to the display panel in order to set operating conditions of the domestic appliance. The invention also relates to a domestic appliance having a corresponding operator control device.

Operator control devices for domestic appliances, such as ovens, washing machines, tumble driers, dishwashers or the like, are known in a variety of designs. For this purpose, touch-sensitive operator control devices having touch areas are as common as operator control elements in the form of rotary switches and pushbutton switches, i.e. operator control elements that have to be moved relative to a display unit in order to set operating conditions.

Particularly in the case of such operator control devices with movable operator control elements combined with electronic display panels as display units, it is difficult or impossible to achieve a compact design while at the same time ensuring user-friendly operability and an intuitively apparent presentation of information. The known components must be disposed separately and also spaced apart from one another. In addition, such operator control elements are known to be large and clumsy, so that they require, for one thing, a large amount of space. This both in respect of their general size as knobs and therefore cylinders, and in respect of their forward projection from the operator control device in order to enable them to be gripped and rotated.

BRIEF SUMMARY OF THE INVENTION

The object of the present invention is to create an operator control device for a domestic appliance and a domestic appliance having a corresponding operator control device, wherein the combination of an electronic display panel and an operator control element that can be moved relative thereto can be made more compact and yet can be operated in a user-friendly and effortless manner.

An operator control device according to the invention for a domestic appliance comprises an electronic display panel and an operator control element which can be moved relative to the display panel in order to set operating conditions of the domestic appliance. Some areas of the operator control element are embedded in a cover of the at least one electronic display panel, and the upper face of an annular front part of the operator control element is disposed in a raised manner in some areas, in particular only in some areas, so as to project beyond the level of an outer face of the cover. This design in respect of the shaping of the front part on the one hand and the arrangement on the other ensures a very compact operator control device particularly in respect of the components of the electronic display panel and of the operator control element. The annular shape of the front part and in particular of the inwardly inclined upper face ensures touchability and operability by a user's finger in a particularly effortless and accurate manner. A user is able to rotate the annular front part very precisely.

An electronic display panel is to be understood as meaning, in particular, a display on which information is displayed in a dynamically changing manner. This can be information comprising letters and/or numbers and/or symbols.

The operator control element preferably has an annular front part having an inwardly inclined upper face. Said front part can be moved relative to the display panel. As a result, touchability and rotational guidance by a user's finger is possible in a particularly reliable and precise manner.

The operator control element is preferably implemented essentially as a ring. A fully cylindrical shape or similar is therefore no longer provided. On the one hand, material can be saved by this means, namely, in respect of the basic operating principle, this can be designed such that the control knob cylinder to be gripped by the barrel as in the prior art is no longer present here; instead it is the front side or rather upper face of this annular front part that is touched by a user and said front part is then rotated. There is therefore effectively provided in principle another surface for touching by the user and for the then associated movement of the operator control element. The annular shape is in this respect a very suitable one, in that an operator control element is provided which has a relatively large diameter. This can be larger than conventional cylindrical control knobs. In particular, the annular shape of the front part and the contact provided with the upper face then also enables the operator control element according to the invention to be very precisely moved to a desired rotary position for setting the required operating conditions, the like of which is not possible with conventional cylindrical operator control elements because, for one thing, the associated rotatability in the case of contact solely on the front of said hollow cylinder is difficult and involves greater force mechanically and also does not provide ease of movement, resulting in incorrect settings. In this respect the conventional cylindrical control knobs are designed such that they are comparatively small in diameter, so that the front of such cylindrical control knobs is also relatively small and, in respect of one finger contact, are very difficult or even impossible to rotate because of the force paths involved.

The operator control element is preferably implemented as a rotary selector. This means that, by setting different rotary positions, the then assigned and desired operating conditions can be selected and/or set.

The setting of operating conditions generally includes both the selection of functional sub-units of a domestic appliance and the setting of values of operating parameters of said functional sub-units. For example, in the case of an oven as a functional sub-unit, the operation of the cooking compartment or of a cooking zone can be provided. In addition, an operating parameter, e.g. the temperature, of the cooking zone or cooking compartment, can be set.

It is preferably provided that the operator control element is of multi-part design and a sliding ring is disposed below the annular front part. The annular front part therefore sits in particular in contact with the sliding ring. The sliding ring is made of a specific material which enables the annular front part to move with minimum friction, thereby providing particularly effortless and user-friendly rotation of the front part. In respect of the sliding ring material, conventional and known polymer materials having particularly low friction can be provided.

It is preferably provided that the operator control element implemented as a ring has magnets, wherein an assigned operating setting of the domestic appliance can be detected by the magnets interacting with fixed metal elements, in particular of an annular metal spider, as a function of a relative movement of the ring, in particular of the annular front part, with respect to the metal elements. The magnets can preferably be mounted on the back of the front part or rather embedded therein. The rotary position of said front part relative to the metal elements, in particular of the annular metal spider, can therefore be detected as a result of this interaction and evaluated by a control unit of the operator control device.

Particularly advantageously, it is provided that the metal elements are disposed on the back of a cover at least partially covering the front of the display panel.

In respect of the metal spiders which are preferably of one-piece design, the diameter is preferably essentially the same as the diameter of the sliding ring and/or annular front part.

The metal spider preferably has a thickness of less than 1 mm, preferably 0.7 mm. It is preferably embedded or disposed in a recess on the back of the cover, thereby facilitating the flat-profile design of the operator control device, while also ensuring that the metal spider is retained in a positionally and mechanically stable manner.

It is preferably provided that the sliding ring is fixedly connected to the annular front part and that, when the front part is rotated, the sliding ring performs the same rotational movement.

In this context it can also be provided that the above-mentioned magnets are disposed in the sliding ring.

It is preferably provided that at least some areas of the operator control element implemented as a ring are permeable to light in the visible spectrum. Such a design enables additional visual information to be communicated to a user. In addition to identifying the operator control element to a user in respect of the general position of the operator control element in the operator control device, an operating condition can also be visually displayed individually by this means. It can be provided that the annular front part can be completely back lit, or that only sections of the ring can be back lit accordingly.

It is preferably provided that the operator control element is embedded in a plate-shaped cover disposed in front of the display panel and in particular permeable to the light of the display panel. Said cover is therefore multifunctional since, on the one hand, it acts as a support for the operator control element and accommodates said operator control element in a space-saving manner. On the other hand, it serves to protect the display panel from wear or damage. Here too, the light-permeable design enables a particularly compact design to be provided in respect of the surface dimensions.

It is preferably provided that the annular molded part, in particular at least its outer edge, projects in particular less than 1.5 mm, in particular less than 1 mm, above the upper face of the cover. This is an advantageous feature particularly to be emphasized, because particularly in conjunction with the funnel-shaped upper face of the annular front part or rather the obliquely inwardly inclined upper face and this slight projection of the outer edge, on the one hand particularly secure gripping and touching of the operator control element can be ensured. On the other hand, it can prevent the finger from unintentionally rubbing excessively along the outer face of the cover. This enables, for one thing, undesirable dirtying of this outer face and unintentional slipping of the finger from the upper face of the annular front part of the operator control element to be prevented. This design of the operator control element particularly facilitates the movement path and makes it particularly user-friendly.

Not least, it should be mentioned in this context that this embedding of the front part and this minimal projection of only the outer edge of said annular front part also has a minimizing effect in respect of the design of the operator control device or rather of its installation depth.

The operator control element implemented as a ring is preferably disposed in a groove in the front of the cover. This means in particular that the annular front part and the sliding ring are disposed in said front groove. This also enables its positioning to be mechanically facilitated and particularly well guided in respect of the relative rotational movement.

It is preferably provided that on the outer face or rather front of this cover a groove is implemented in which the sliding ring and the annular front part are disposed in a recessed manner. There is preferably implemented in a congruent manner, on the back of this cover, a groove in which the metal spider is positioned. In particular, in a first design, it can be provided that there is still cover material between the two grooves and therefore also between the metal spider and the sliding ring.

In an alternative design it can be provided that the cover has a complete cutout. The above-mentioned components of the operator control element can then be mounted in this hole cutout and a back cover, e.g. a plate or a plastic part, can be provided which then closes off the structure from behind. It can likewise be provided that another corresponding glass part is then inserted in this hole and fastened, wherein the above-mentioned components of the operator control element are then disposed therein.

However, in addition to the already mentioned multi-part design of the operator control element, a single-piece or one-part design can also be provided.

A back-lighting option already discussed above can also be provided here, wherein, in the ring, corresponding thinner rings or ring sections, points or segments would then be visually displayable. This enables indications of a setting of an operation or the execution of a program of the appliance to be given. This could also be displayed inside or outside the ring or digitally in the display panel or visually represented.

The fastening of the components of the operator control element, in particular the annular components can be held in place, for example, via retaining magnets.

It is preferably provided that the cover is a glass plate, having in particular a thickness of less than 10 mm, in particular less than 8 mm, preferably between 6 and 4 mm. This thickness creates sufficient mechanical stability for embedding the components of the operator control element while nevertheless being thin enough to ensure good permeability to the optical signals of the display panel and minimize the overall depth of the cover.

It is preferably provided that the upper face of the annular front part of the operator control element is made of metal. For example, a metal coating can be applied here. However, it can also be provided that the front part is made completely of metal. In the case of a design with a metallic upper face, on the one hand a high-quality impression is conveyed, and on the other low wear is ensured.

It is preferably provided that at least some areas of the movable operator control element are disposed within the surface area of the electronic display panel. This makes it possible to achieve freedom of movement of the operator control element while providing a multiple and digital or rather dynamically changing display of information on the electronic display panel in very close proximity to the operator control element.

The statement that the operator control element is within the surface area of the display panel also means that, when the operator control device is viewed from the front, the surface extent of the operator control element extends into the surface extent of the display panel. Here the operator control element can be disposed in front of the display panel or be incorporated in the display panel. It can also be provided that the styling of the display panel at the region facing the operator control element is matched to the outline of the operator control element, and the edge regions of the display panel and of the operator control element directly abut one another at the adjoining region. This is also encompassed by the meaning of being disposed within. If, for example, the display panel is angular, in particular rectangular, and the operator control element has a circular edge outline, it can be provided that the display panel, at the position where the operator control element is located, comprises a circular-segment-shaped cutout into which the operator control element extends.

It is preferably provided that on at least one area of the display panel the information to be displayed can be changed as a function of the movement of the operator control element. Thus in this connection different menu interfaces can be displayed on the electronic display panel. The menu interfaces can be called up and selected depending on the rotational position of the operator control element. It can also be provided that the basically displayed menu interfaces are then displayed with additional menu content when called up by a specific rotational position of the operator control element.

It is preferably provided that a menu interface to be displayed on the display panel is displayable or displayed around the operator control element. If the operator control element has a circular edge outline, it can be provided that menu items selectable by the operator control element are disposed in a ring section on the display panel around the operator control element, adjacent to the operator control element.

The invention also relates to a domestic appliance having an operator control device according to the invention or an advantageous embodiment thereof. The domestic appliance is in particular designed for preparing food or handling laundry items or cleaning dishes. In this connection, typical domestic appliances can be an oven, a washing machine, a clothes dryer, a dishwasher, a refrigerator, a freezer or the like.

Further features of the invention will emerge from the claims, the figures and the descriptions thereof. The features and feature combinations mentioned in the above description and the features and feature combinations only shown individually in the figures and/or the features and feature combinations mentioned only the description of the figures can be used not only in the respective combination specified, but also in other combinations, or alone, without departing from the scope of the invention.

BRIEF DESCRIPTION OF THE DRAWINGS

Exemplary embodiments of the invention will now be explained in greater detail with reference to the accompanying schematic drawings in which:

FIG. 5 shows a schematic front view of an exemplary embodiment of an operator control device according to the invention.

DETAILED DESCRIPTION OF EXEMPLARY EMBODIMENTS OF THE PRESENT INVENTION

Figure 1:
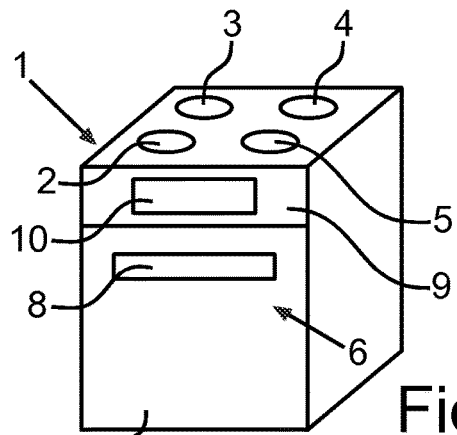
FIG. 1 shows a schematic perspective view of an exemplary embodiment of a domestic appliance according to the invention.

Elements that are identical or have an identical function are provided with the same reference characters in the figures.

FIG. 1 shows a simplified schematic view of a domestic appliance implemented as a baking oven 1. The oven 1 comprises four cooking zones 2, 3, 4 and 5 and a cooking compartment 6 that can be closed by a door 7 having a handle 8 on its outer side. Disposed above the door 7 in this example is a fascia panel 9 comprising an operator control device 10. Both the position and the design of the fascia panel 9 are merely by way of example.

Figure 2:
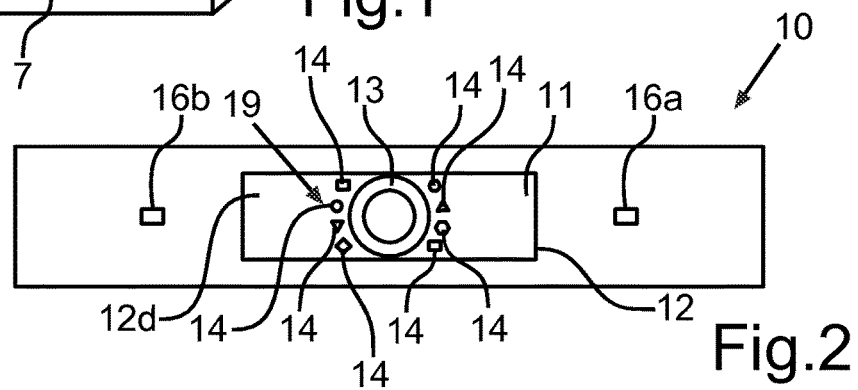
FIG. 2 shows a schematic front view of an exemplary embodiment of an operator control device according to the invention.

FIG. 2 shows a simplified front view of an exemplary embodiment of the operator control device 10. The operator control device 10 comprises an electronic display panel 11. On the display panel 11 which is delimited by the edge or boundary 12 which is of rectangular design in the example, information can be displayed in a dynamically changeable manner. On such a screen, different information can be displayed in the form of letters and/or numbers and/or symbols.

The operator control device 10 additionally comprises an operator control element 13 which, in the example, is a rotary selector. As can be seen from FIG. 2, the rotary selector 13 is disposed completely within the area 12d having the boundary 12 of the electronic display panel 11 with its surface dimensions projected into the plane of the figure when viewed from the front. It is therefore effectively positioned completely embedded in the surface dimensions of the display panel 11. Because of its implementation as a rotary selector, the operator control element 13 can be moved relative to the display panel 11. The associated operating conditions of the oven 1 are set by rotating the operator control element 13. As can be seen, an information display which in FIG. 2 takes the form of symbols 14 is implemented adjacent to and at least in ring sections around the annular operator control element 13. The number of symbols 14 indicated is merely by way of example. It can also be provided that, instead of symbols 14, numbers and/or letters are displayed. Alternatively, the information around the annular operator control element 13 can also be menu interfaces, for example, which then define a certain folder structure. The information then displayed can be, for example, a name for a folder in which further information is then contained. If such a folder is then called up by rotating the operator control element 13, the menu content can be displayed in greater detail.

As can be seen from the exemplary embodiment in FIG. 2, two control elements 16a and 16b are implemented outside the area 12d of the display panel 11 having the boundary 12. In the example, these control elements 16a and 16b are implemented as touch panels. Their functions can include, for example, switching the oven 1 on and off. Additionally or instead, it can also be provided that at least one of the control elements 16a or 16b is designed to set the information depth of a menu content to be displayed on the display panel 11. This means that the information, as shown in FIG. 2 as symbols 14 or as generic menu names of a menu interface, can be changed by one of the control elements 16a or 16b. If appropriate it is thus possible to set a folder name to be displayed such that it is not the higher-order overall folder, but already represents a lower-order folder structure and, for example, a sub-folder is displayed as the default setting.

It can also be provided that the control element 16a and/or 16b is disposed within the area 12d of the display panel 11 having the boundary 12.

Figure 3:
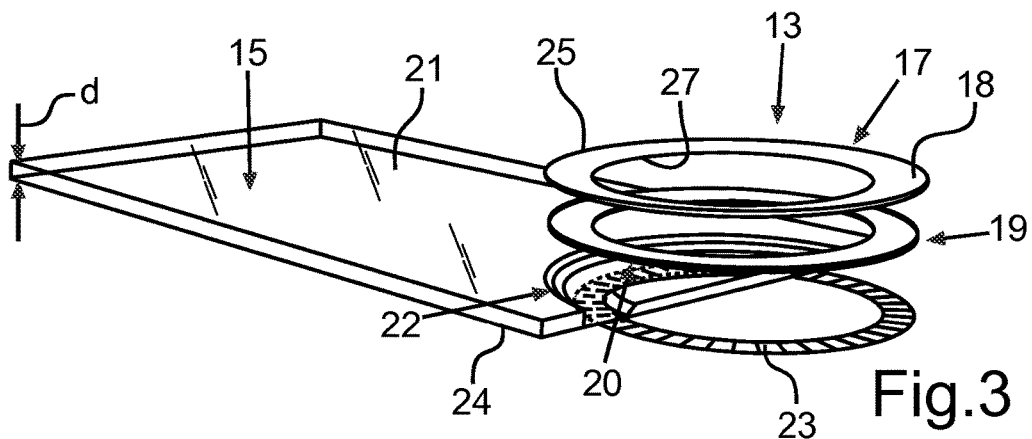
FIG. 3 shows a sectional view through sub-components of the operator control device as shown in FIG. 2.

FIG. 3 is a perspective view showing the cover 15 indicated in FIG. 2 in the form of a glass plate. The cover 15 is shown cut in the region of the operator control element 13. The operator control element 13 is shown in an exploded view. As can be seen, the operator control element 13 is of multi-part design, comprising an annular front part 17 having a front or upper face 18. The upper face 18 is inclined obliquely inward so that the upper face 18 effectively imparts a funnel-shaped to the front part 17. The inward inclination is preferably between 3° and 15° with respect to the plane in which the annular front part 17 extends. In the exemplary embodiment, the front part 17 is a one-piece aluminum component.

The operator control element 13 additionally comprises a sliding ring 19 which is disposed below the front part 17. It is likewise of one-piece design and made of a particularly low-friction material. It is preferably non-rotatably connected to the front part 17. In the example it is provided that a plurality of magnets 20 are disposed on and/or in the sliding ring 19. These magnets are used to retain the sliding ring 19 and the front part 17 in an annular groove 22 implemented in the outer face 21 of the cover 15.

In addition, the rotational position relative to a metal spider 23 is detected by these magnets 20, a plurality of which can also be disposed, for example, equidistantly around the circumference of the sliding ring 19. As shown in FIG. 3, the metal spider 23 is likewise implemented as a ring having a thickness of approximately 0.7 mm.

It is preferably provided that an annular groove in which the metal spider 23 is disposed is likewise implemented on the back 24 of the cover 15. The term metal spider encompasses the annular shape having spider-like or pointed peaks and/or radial extensions.

Material of the cover 15, i.e. glass material, is additionally present between the groove 22 and the groove 26 (FIG. 4) implemented on the back 24 for the metal spider 23, so that in this respect no through-hole or cutout is implemented.

The thickness D of the cover 15, which is in particular a rectangular glass plate, is 4 mm in the example.

It can also be provided that at least some areas of the front part 17 and the sliding ring 19 are permeable to light in the visible spectrum, thereby enabling at least ring sections of the front part 17 and of the sliding ring 19 to be back-lit.

By means of a control unit (not shown), the rotational position of the sliding ring 19 and of the front part 17 relative to the metal spider 23 can be detected and, as a result, the specific rotational position and therefore the relative position with respect to the cover 15 and therefore also to the display panel 11 can be registered and the assigned operating condition setting recognized and carried out.

Figure 4:
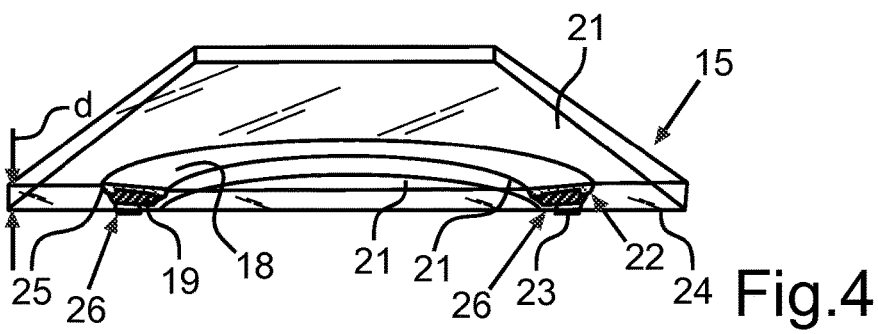
FIG. 4 shows an exploded view of the representation in FIG. 3.

FIG. 4 shows the representation in FIG. 3 in the assembled state. It can be seen here that an outer edge 25 of the annular front part 17 stands approximately 0.5 mm proud of the outer face 21. The obliquely inward and downward running upper face 18 is likewise visible. Also shown here is the groove 26 for the metal spider 23. In respect of the inner edge 27 of the annular front part 17, this can be flush with the outer face 21. Because of the obliquely inward and downward running upper face 18, it is then provided that this portion of the outer face 21 enclosed by the operator control element 13 is offset downward with respect to the area of the outer face 21 implemented outside the annular front part 17. However, it can also be provided that this inner edge 27 is likewise disposed slightly proud of this portion of the outer face 21 enclosed by the front part 17. At least some areas of the cover 15 are disposed in front of the electronic display panel 11 and are permeable to the optical signals and information of the display panel 11.

The portion of the outer face 21 enclosed by the annular operator control element 13 is preferably also implemented as a display area of the display panel 11.

FIG. 5 shows another schematic front view of an operator control device 10. In contrast to that shown in FIG. 2, here it is provided that a plurality of electronic display panels 11a, 11b and 11c are provided. These are implemented as separate display panels arranged with space between them. This means that their outlines or rather surface boundaries 12a, 12b and 12c do not overlap or rather are disposed a certain distance apart. However, the spacing of the display panels 11a, 11b and 11c is designed such that at least some areas of the operator control element 13 extend into each surface area having the boundaries 12a, 12b and 12c. As can be seen, some areas of the surface of the annular front part 17 overlap the surface delimited by the boundary 12a, the surface delimited by the boundary 12b and the surface delimited by the boundary 12c.

It is provided that the cover 15 is a one-piece glass plate frontally covering all three display panels 11a, 11b and 11c. When the operator control device 10 is viewed from the front, it is therefore preferably not apparent that there are separate display panels 11a, 11b and 11c behind it. In particular, this can be achieved by making the cover 15 slightly tinted, for example, yet completely permeable to the optical signals of the display panels 11a, 11b and 11c.

By means of the operator control device 10 according to the invention, or rather an embodiment thereof, it is possible to provide an operator control element for simple value setting or function selection that is integrated to the largest possible extent into the appliance fascia, yet easily rotatable in each position. As a result, the combination of a manually movable operator control element for setting these values or selecting functions and an electronic display unit is much more clearly laid out in respect of functionality, compactness and user-friendliness, and ensures locally concentrated operation and information display. A direct position relationship can be achieved between the respective operator control elements, in particular a rotary selector, and a display of information disposed in a circle around it in an extremely compact and contiguous manner.

In addition to the other specific remarks with reference to FIGS. 3 and 4, in which the upper face 18 is disposed inclined obliquely inward and downward and therefore the front part 17 is funnel-shaped in cross-section on its upper face 18, it can also be provided that said upper face 18 has no such inclination, but effectively extends in one plane. The entire surface of the upper face 18 is then disposed on one level which extends raised above the level of the outer face 21 of the cover 15.

The cover 15 can be implemented in a variety of designs and, in addition to the glass plate in the example, can, however, be implemented in any other design as a fascia panel and front closure of the display panel 11 or display panels 11a, 11b and 11c as the case may be. As well as being a glass plate, the cover can also be implemented, for example, as an optical filter plate. In addition, back-lit display foils can also be disposed behind the cover.

It can be provided that the operator control element is implemented as a circular touch slider and therefore as a touch-sensitive operator control element wherein, to set operating conditions, a user must not only press points on the touch-sensitive panel with a finger, but additionally perform a movement on said touch-sensitive panel in order to initiate or carry out the associated operating setting. However, in the case of a design of this kind there is then no operator control element present that can be moved mechanically relative to the display panel in order to set operating conditions.

The invention claimed is:

1. An operator control device for a domestic appliance, comprising:
   a first electronic display panel having a cover, and an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover, wherein the upper face of the annular front part is ring-shaped with the upper face having an outer edge and an inner edge, and
   wherein the cover of the first electronic display panel includes an annular groove having an outer edge and an inner edge, wherein the annular front part is embedded, at least in part, in the annular groove of the cover of the electronic display panel and the annular front part is rotatable relative to the first electronic display panel.

2. The operator control device of claim 1, wherein the operator control element is implemented as a rotary selector and the annular front part is rotatable relative to the cover.

3. The operator control device of claim 1, wherein the operator control element is of multi-part design, and further comprising a sliding ring disposed below the annular front part.

4. The operator control device of claim 1, wherein the operator control element is implemented as a ring including the upper face of the annular front part having the outer edge and the inner edge and has magnets which interact with fixed metal elements to detect an assigned operating setting of the domestic appliance as a function of a movement of the operator control element relative to the metal elements.

5. The operator control device of claim 4, wherein the metal elements are configured as an annular metal spider.

6. The operator control device of claim 4, wherein the metal elements are disposed on a back of the cover.

7. The operator control device of claim 6, wherein the metal elements are disposed in a groove on the back of the cover.

8. The operator control device of claim 1, wherein the cover is permeable to light of the display panel.

9. The operator control device of claim 1, wherein the upper face is of obliquely inward and downward running design.

10. The operator control device of claim 1, wherein the annular front part has at least the outer edge which projects above the outer face of the cover.

11. The operator control device of claim 10, wherein the outer edge of the annular front part projects above the outer face of the cover by less than 1.5 mm.

12. The operator control device of claim 1, wherein the upper face of the annular front part projects above the outer face of the cover.

13. The operator control device of claim 12, wherein the upper face of the annular front part projects above the outer face of the cover by less than 1.5 mm.

14. An operator control device for a domestic appliance, comprising:
   a first electronic display panel having a cover, and
   an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover,
   wherein sub-components of the operator control element implemented as a ring including the upper face of the annular front part having an outer edge and an inner edge are disposed in a groove in the outer face of the cover.

15. The operator control device of claim 1, wherein the cover is a glass plate.

16. The operator control device of claim 15, wherein the glass plate has a thickness of less than 10 mm.

17. The operator control device of claim 15, wherein the glass plate has a thickness of between 6 and 4 mm.

18. The operator control device of claim 1, wherein the operator control element is disposed, at least in part, within a surface area of the electronic display panel.

19. The operator control device of claim 1, further comprising a second separate electronic display panel adjacently disposed to the first electronic display panel, wherein the operator control element is disposed, at least in part, inside surface areas of the first and second electronic display panels.

20. The operator control device of claim 1, wherein the cover covers, at least in part, a front of the first and second electronic display panels.

21. The operator control device of claim 1, wherein the electronic display panel has at least one area to display information which is changeable as a function of a movement of the operator control element.

22. The operator control device of claim 1, further comprising a menu interface having at least two selectable menu items adapted for display around the operator control element on the electronic display panel.

23. The operator control device of claim 22, wherein the menu interface is displayed in a ring section bordering an edge of the operator control element.

24. A domestic appliance, comprising an operator control device including a first electronic display panel having a cover, and an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover, wherein the upper face of the annular front part is ring-shaped with the upper face having an outer edge and an inner edge, and wherein the cover of the first electronic display panel includes an annular groove having an outer edge and an inner edge, wherein the annular front part is embedded, at least in part, in the annular groove of the cover of the electronic display panel and the annular front part is rotatable relative to the first electronic display panel.

25. The domestic appliance of claim 24, wherein the operator control element is implemented as a rotary selector and the annular front part is rotatable relative to the cover.

26. A domestic appliance, comprising an operator control device including a first electronic display panel having a cover, and an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover,
- wherein the operator control element is of multi-part design, the operator control device having a sliding ring disposed below the annular front part,
- wherein the cover of the electronic display panel has a plate-shaped outer face including an annular groove having a lower groove surface disposed below the plate-shaped outer face of the cover, and
- wherein at least a portion of the sliding ring is embedded in the annular groove, the annular front part is non-rotatably coupled to the sliding ring, and the sliding ring is rotatable within the annular groove such that the sliding ring and the annular front part are movable relative to the plate-shaped outer face of the cover.

27. The domestic appliance of claim 24, wherein the operator control element is implemented as a ring including the upper face of the annular front part having the outer edge and the inner edge and has magnets which interact with fixed metal elements to detect an assigned operating setting of the domestic appliance as a function of a movement of the operator control element relative to the metal elements.

28. The domestic appliance of claim 27, wherein the metal elements are configured as an annular metal spider.

29. The domestic appliance of claim 27, wherein the metal elements are disposed on a back of the cover.

30. The domestic appliance of claim 29, wherein the metal elements are disposed in a groove on the back of the cover.

31. The domestic appliance of claim 24, wherein the cover is permeable to light of the display panel.

32. The domestic appliance of claim 24, wherein the upper face is of obliquely inward and downward running design.

33. The domestic appliance of claim 24, wherein the annular front part has at least the outer edge which projects above the outer face of the cover.

34. The domestic appliance of claim 33, wherein the outer edge of the annular front part projects above the outer face of the cover by less than 1.5 mm.

35. The domestic appliance of claim 24, wherein the upper face of the annular front part projects above the outer face of the cover.

36. The domestic appliance of claim 35, wherein the upper face of the annular front part projects above the outer face of the cover by less than 1.5 mm.

37. A domestic appliance, comprising an operator control device including a first electronic display panel having a cover, and an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover,
- wherein sub-components of the operator control element implemented as a ring including the upper face of the annular front part having an outer edge and an inner edge are disposed in a groove in the outer face of the cover.

38. The domestic appliance of claim 24, wherein the cover is a glass plate.

39. The domestic appliance of claim 38, wherein the glass plate has a thickness of less than 10 mm.

40. The domestic appliance of claim 38, wherein the glass plate has a thickness of between 6 and 4 mm.

41. The domestic appliance of claim 24, wherein the operator control element is disposed, at least in part, within a surface area of the electronic display panel.

42. The domestic appliance of claim 24, wherein the operator control device includes a second separate electronic display panel adjacently disposed to the first electronic display panel, wherein the operator control element is disposed, at least in part, inside surface areas of the first and second electronic display panels.

43. The domestic appliance of claim 24, wherein the cover covers, at least in part, a front of the first and second electronic display panels.

44. The domestic appliance of claim 24, wherein the electronic display panel has at least one area to display information which is changeable as a function of a movement of the operator control element.

45. The domestic appliance of claim 24, wherein the operator control device includes a menu interface having at least two selectable menu items adapted for display around the operator control element on the electronic display panel.

46. The domestic appliance of claim 45, wherein the menu interface is displayed in a ring section bordering an edge of the operator control element.

47. An operator control device for a domestic appliance, comprising:
- a first electronic display panel having a cover, and
- an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover,
- wherein the cover of the electronic display panel includes an annular groove having an outer edge and an inner edge, wherein the annular front part is embedded, at least in part, in the annular groove of the cover of the electronic display panel and the annular front part is rotatable relative to the display panel, and wherein the upper face of the annular front part is ring-shaped and has an outer edge and an inner edge corresponding to the outer edge and the inner edge of the annular groove.

48. The operator control device of claim 3, wherein the sliding ring is embedded in the cover of the electronic display panel below the annular front part and the sliding ring is movable relative to the display panel.

49. An operator control device for a domestic appliance, comprising:
- a first electronic display panel having a cover, and
- an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover,
- wherein the operator control element is of multi-part design, and further comprising a sliding ring disposed below the annular front part,
- wherein each of the upper face of the annular front part and the sliding ring is ring-shaped and has an outer edge and an inner edge, wherein the annular front part is non-rotatably coupled to the sliding ring, wherein the annular front part and the sliding ring are embedded, at least in part, in the cover of the electronic display panel, and wherein the annular front part and the sliding ring are movable relative to the display panel.

50. An operator control device for a domestic appliance, comprising:

a first electronic display panel having a cover, and an operator control element movable relative to the display panel to set operating conditions of the domestic appliance, a moveable part of said operator control element being embedded, at least in part, in the cover of the electronic display panel, and including an annular front part having an upper face which projects, at least in part, above a level of an outer face of the cover, wherein the cover of the electronic display panel includes an annular groove having an outer edge and an inner edge, wherein the operator control element includes an annular metal element fixed in the annular groove, wherein the annular front part is embedded, at least in part, in the annular groove of the cover and the annular front part has an outer edge and an inner edge corresponding to the outer edge and the inner edge of the annular groove, and wherein the annular front part is movable relative to the annular metal element and the display panel.

51. The operator control device of claim 50, wherein the annular front part is magnetically retained in the annular groove of the cover while being movable relative to the annular metal element and the display panel.

52. The operator control device of claim 50, wherein the operator control element further includes a sliding ring embedded, at least in part, in the annular groove, wherein the sliding ring is non-rotatably coupled to the annular front part, and wherein the annular front part and the sliding ring are movable in the annular groove relative to the annular metal element and the display panel.

53. The operator control device of claim 47, wherein the upper face of the annular front part is of obliquely inward and downward running design, and wherein at least the outer edge of the upper face of the annular front part projects above the outer face of the cover.

54. The operator control device of claim 53, wherein the inner edge of the upper face of the annular front part one of projects above the outer face of the cover, is flush with the outer face of the cover, and is recessed with respect to the outer face of the cover.

55. The operator control device of claim 49, wherein the upper face of the annular front part is of obliquely inward and downward running design, wherein an upper face of the sliding ring is of obliquely inward and downward running design corresponding to the annular front part, and wherein at least the outer edge of the upper face of the annular front part projects above the outer face of the cover.

56. The operator control device of claim 1, wherein at least the outer edge projects above the level of the outer face of the cover that surrounds the annular front part.

57. The operator control device of claim 1, wherein at least a portion of the upper face of the annular front part is one of flush with the outer face of the cover that surrounds the annular front part and offset downward with respect to the outer face of the cover that surrounds the annular front part.

58. The operator control device of claim 1, wherein the inner edge of the upper face of the annular front part is one of flush with the level of the outer face of the cover that surrounds the annular front part and offset downward with respect to the level of the outer face of the cover that surrounds the annular front part.

59. The operator control device of claim 1, wherein the inner edge of the upper face of the annular front part projects above the level of the outer face of the cover.

60. The operator control device of claim 1, wherein a portion of the outer face of the cover is disposed in a region encircled by the inner edge of the upper face of the annular front part.

61. The operator control device of claim 1, wherein the cover of the electronic display panel includes the annular groove having the outer edge and the inner edge corresponding to the outer edge and the inner edge of the annular front part, and wherein the annular front part is rotatable within the annular groove relative to the cover.

62. The domestic appliance of claim 24, wherein at least the outer edge projects above the level of the outer face of the cover that surrounds the annular front part.

63. The domestic appliance of claim 24, wherein at least a portion of the upper face of the annular front part is one of flush with the outer face of the cover that surrounds the annular front part and offset downward with respect to the outer face of the cover that surrounds the annular front part.

64. The domestic appliance of claim 24, wherein the inner edge of the upper face of the annular front part is one of flush with the level of the outer face of the cover that surrounds the annular front part and offset downward with respect to the level of the outer face of the cover that surrounds the annular front part.

65. The domestic appliance of claim 24, wherein the inner edge of the upper face of the annular front part projects above the level of the outer face of the cover.

66. The domestic appliance of claim 24, wherein a portion of the outer face of the cover is disposed in a region encircled by the inner edge of the upper face of the annular front part.

67. The domestic appliance of claim 24, wherein the cover of the electronic display panel includes the annular groove having the outer edge and the inner edge corresponding to the outer edge and the inner edge of the annular front part, and wherein the annular front part is rotatable within the annular groove relative to the cover.

68. The domestic appliance of claim 24, wherein the operator control device includes a sliding ring embedded in the cover of the electronic display panel below the annular front part, and wherein the annular front part is non-rotatably coupled to the sliding ring, and the annular front part and the sliding ring are movable relative to the display panel.

69. The domestic appliance of claim 24, wherein the operator control device includes an annular metal element fixed in the annular groove, and the annular front part is movable relative to the annular metal element and the display panel.

70. The domestic appliance of claim 69, wherein the annular front part is magnetically retained in the annular groove of the cover while being movable relative to the annular metal element and the display panel.

71. The domestic appliance of claim 68, wherein the operator control device includes an annular metal element fixed in the annular groove, and the annular front part and the sliding ring are movable in the annular groove relative to the annular metal element and the display panel.

\* \* \* \* \*